United States Patent
Zou et al.

(10) Patent No.: US 9,906,692 B2
(45) Date of Patent: Feb. 27, 2018

(54) MEDIA STREAM SHARING METHOD AND TERMINAL

(71) Applicant: Huawei Device Co., Ltd., Shenzhen (CN)

(72) Inventors: Xianjun Zou, Shenzhen (CN); Dong Tang, Hangzhou (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 423 days.

(21) Appl. No.: 14/586,247

(22) Filed: Dec. 30, 2014

(65) Prior Publication Data
US 2015/0120958 A1 Apr. 30, 2015

Related U.S. Application Data

(63) Continuation of application No. PCT/CN2012/086432, filed on Dec. 12, 2012.

(51) Int. Cl.
*H04N 5/04* (2006.01)
*H04L 29/06* (2006.01)

(52) U.S. Cl.
CPC ........... *H04N 5/04* (2013.01); *H04L 65/1069* (2013.01); *H04L 65/1093* (2013.01); *H04L 65/60* (2013.01)

(58) Field of Classification Search
CPC .................. H04L 65/1069; H04L 65/1093
USPC ........................................................ 709/231
See application file for complete search history.

(56) References Cited

U.S. PATENT DOCUMENTS

| | | |
|---|---|---|
| 2008/0246835 A1 | 10/2008 | Tian |
| 2010/0121942 A1 | 5/2010 | Ooi et al. |
| 2012/0147825 A1 | 6/2012 | Hassan et al. |
| 2012/0303705 A1 | 11/2012 | Park et al. |

FOREIGN PATENT DOCUMENTS

| | | |
|---|---|---|
| CN | 101964842 A | 2/2011 |
| CN | 102325182 A | 1/2012 |
| CN | 102364957 A | 2/2012 |

(Continued)

OTHER PUBLICATIONS

Foreign Communication From a Counterpart Application, Chinese Application No. 201280004124.6, Chinese Office Action dated Aug. 13, 2015, 8 pages.

(Continued)

*Primary Examiner* — Adnan Mirza
(74) *Attorney, Agent, or Firm* — Conley Rose, P.C.

(57) ABSTRACT

A media stream sharing method and terminal, where the method includes, after a first terminal receives a start instruction triggered by a user to start a service of sharing audio and video, searching for, according to the start instruction, a terminal capable of implementing sharing of a media stream with the first terminal, and displaying the found terminal or terminal list; when the first terminal determines that a terminal selected by a user according to the displayed terminal or terminal list is a second terminal, obtaining a playing attribute of the second terminal; and synchronizing, by the first terminal according to the playing attribute, a media stream currently played to the second terminal, causing the second terminal to decode and play the media stream. The method solves problems of audio and video asynchronization, operational complexity, and high costs during media stream sharing in the prior art.

18 Claims, 5 Drawing Sheets

---

After receiving a start instruction triggered by a user to start a service of sharing audio and video, a first terminal searches for, according to the start instruction, a terminal capable of implementing sharing of a media stream with the first terminal, and displays the found terminal or terminal list — 101

When determining that a terminal selected by a user according to the displayed terminal or terminal list is a second terminal, the first terminal obtains a playing attribute of the second terminal — 102

The first terminal synchronizes a media stream to the second terminal according to the playing attribute, where the media stream is sent by a third terminal, causing the second terminal to decode and play the media stream — 103

(56) References Cited

FOREIGN PATENT DOCUMENTS

| | | |
|---|---|---|
| CN | 102447956 A | 5/2012 |
| CN | 102638774 A | 8/2012 |
| CN | 102752667 A | 10/2012 |
| KR | 20100117814 A | 11/2010 |

OTHER PUBLICATIONS

Foreign Communication From a Counterpart Application, Japanese Application No. 2015-071549996, Japanese Office Action dated Oct. 19, 2015, 7 pages.
Foreign Communication From a Counterpart Application, Japanese Application No. 2015-071549996, English Translation of Japanese Office Action dated Oct. 30, 2015, 11 pages.
Partial English Translation and Abstract of Chinese Patent Application No. CN101964842A, Feb. 28, 2015, 3 pages.
Foreign Communication From a Counterpart Application, PCT Application No. PCT/CN2012/086432, English Translation of International Search Report dated Sep. 19, 2013, 2 pages.
Foreign Communication From a Counterpart Application, PCT Application No. PCT/CN2012/086432, Written Opinion dated Sep. 19, 2013, 7 pages.
Foreign Communication From a Counterpart Application, European Application No. 12889957.2, Extended European Search Report dated Jun. 25, 2015, 7 pages.
Foreign Communication From a Counterpart Application, European Application No. 12889957.2, European Summons to attend oral proceedings dated Jul. 19, 2017, 11 pages.

In a process of receiving the media stream by a first terminal, when a terminal that is capable of implementing sharing of a media stream with the first terminal and is found by the first terminal according to a start instruction of a service of sharing audio and video is a second terminal, the second terminal receives an attribute obtaining request sent by the first terminal, where the attribute obtaining request includes a bit rate, resolution, a frame rate, and/or encoding and decoding information of a media stream currently played — 301

If the second terminal determines, according to the attribute obtaining request, that the bit rate and the resolution of the media stream, the frame rate of the media stream, and/or the encoding and decoding information of the media stream can be supported, send a playing attribute of the second terminal to the first terminal, where the playing attribute includes a listening address and port of the second terminal — 302

The second terminal receives a media stream of a third terminal that is received by the first terminal and is sent by the first terminal according to the playing attribute — 303

FIG. 3

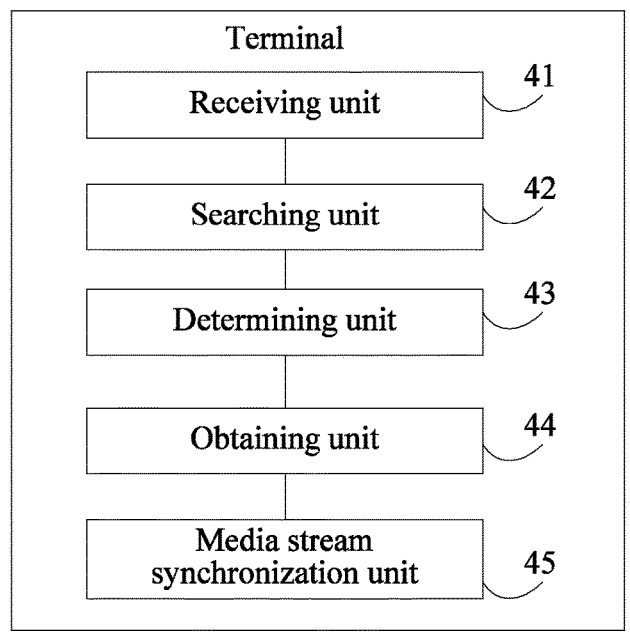

FIG. 4

MEDIA STREAM SHARING METHOD AND TERMINAL

CROSS-REFERENCE TO RELATED APPLICATIONS

This application is a continuation of International Application No. PCT/CN2012/086432, filed on Dec. 12, 2012, which is hereby incorporated by reference in its entirety.

TECHNICAL FIELD

Embodiments of the present invention relate to communication technologies, and in particular, to a media stream sharing method and terminal.

BACKGROUND

With rise of Wireless Fidelity (WiFi) and intelligent mobile phones, multi-screen sharing and multi-screen integration are extremely hot research points of various communication and Internet technology (IT) vendors currently. In a home environment, displaying voice and video content on a mobile phone, a tablet computer, or a pad onto a TV screen greatly improves user experience and product competitiveness.

An existing technology is the airplay technology of an intelligent terminal. The airplay technology enables, within a local home area network, a screen on the intelligent terminal to be shared onto an intelligent television (TV) for playing. A specific process may include: The intelligent terminal finds a set top box or an intelligent TV service entry on the local home area network using an internal private service discovery technology; when a user starts the airplay screen sharing service on the intelligent terminal and selects, from a sharing device list, a device for receiving the sharing; the airplay service on the intelligent terminal captures and copies content in a screen cache; the Airplay service performs an encoding operation for captured and copied cache data, and sends encoded data to the airplay service entry on the intelligent TV, the set top box, or the pad through a WiFi network, so that the airplay service on the pad, the set top box, or the intelligent TV decodes a received data stream and plays the received data stream on the screen.

However, in the foregoing method, the content is captured directly from the screen cache and is encoded, which occupies a high bandwidth and has a high requirement on hardware. In addition, because many processing procedures are involved and the content can be played on a sharing device only after the capturing, the encoding, the WiFi transmission, and the decoding are performed, the foregoing method has a long delay (the delay is over 200 milliseconds (ms) for airplay of the existing intelligent terminal), and a feeling of delay is obvious during running of a service similar to a video call, which causes poor experience; furthermore, synchronous audio transmission cannot be implemented, which may also cause a regret in user experience.

SUMMARY

In view of this, embodiments of the present invention provide a media stream sharing method and terminal, so as to solve problems of audio and video asynchronization and high costs during media stream sharing in the prior art.

In one aspect, an embodiment of the present invention provides a media stream sharing method, including, after a first terminal receives a start instruction triggered by a user to start a service of sharing audio and video, searching for, according to the start instruction, a terminal capable of implementing sharing of a media stream with the first terminal, and displaying the found terminal or terminal list; when the first terminal determines that a terminal selected by a user according to the displayed terminal or terminal list is a second terminal, obtaining a playing attribute of the second terminal; and synchronizing, by the first terminal, a media stream to the second terminal according to the playing attribute, where the media stream is sent by a third terminal, causing the second terminal to decode and play the media stream.

With reference to the first aspect, in a first possible implementation manner, before the first terminal receives the start instruction triggered by a user to start the service of sharing audio and video, the method further includes having received, by the first terminal, the media stream sent by the third terminal.

With reference to the first aspect and the foregoing possible implementation manner, in a second possible implementation manner, the obtaining a playing attribute of the second terminal includes sending, by the first terminal, an attribute obtaining request to the second terminal, where the attribute obtaining request includes a bit rate, resolution, a frame rate, and/or encoding and decoding information of a media stream currently played; and after the second terminal determines that the bit rate and the resolution of the media stream, the frame rate of the media stream, and/or the encoding and decoding information of the media stream are supported, receiving, by the first terminal, the playing attribute sent by the second terminal, where the playing attribute includes a listening address and port of the second terminal.

With reference to the first aspect and the second possible implementation manner, in a third possible implementation manner, before the receiving, by the first terminal, the playing attribute sent by the second terminal, the method further includes receiving, by the first terminal, a determining response of supporting the bit rate and the resolution of the media stream, the frame rate of the media stream, and/or the encoding and decoding information of the media stream, where the determining response is sent by the second terminal and includes a bit rate, resolution, a frame rate of the media stream, and/or encoding and decoding information of the media stream that are supported by the second terminal.

With reference to the first aspect and the foregoing possible implementation manners, in a fourth possible implementation manner, the synchronizing, by the first terminal, a media stream to the second terminal according to the playing attribute, where the media stream is sent by a third terminal includes copying, by the first terminal, the media stream sent by the third terminal, and sending the copied media stream to the listening address and port of the second terminal.

With reference to the first aspect and the first possible implementation manner, in a fifth possible implementation manner, the method further includes sending, by the first terminal, an ending notification to the second terminal after transmission of the media stream of the third terminal stops, causing the second terminal to disable the listening address and port of the second terminal according to the ending notification.

In a second aspect, an embodiment of the present invention further provides a media stream sharing method, including, in a process of receiving the media stream by a first terminal, when a terminal that is capable of implementing sharing of a media stream with a first terminal and is found by the first terminal according to a start instruction of a service of sharing audio and video is a second terminal, receiving, by the second terminal, an attribute obtaining request sent by the first terminal, where the attribute obtaining request includes a bit rate, resolution, a frame rate, and/or encoding and decoding information of a media stream currently played on the first terminal; if the second terminal determines, according to the attribute obtaining request, that the bit rate and the resolution of the media stream, the frame rate of the media stream, and/or the encoding and decoding information of the media stream can be supported, sending a playing attribute of the second terminal to the first terminal, where the playing attribute includes a listening address and port of the second terminal; and receiving, by the second terminal, a media stream of a third terminal that is received by the first terminal and is sent by the first terminal according to the playing attribute.

With reference to the second aspect, in a first possible implementation manner, the method further includes, if it is determined, according to the attribute obtaining request, that the bit rate, the resolution, the frame rate, and/or the encoding and decoding information of the media stream currently played fail to be supported, sending a response of a support failure to the first terminal, causing the first terminal to end the service of sharing audio and video with the second terminal.

With reference to the second aspect, in a second possible implementation manner, before the sending a playing attribute of the second terminal to the first terminal, the method further includes sending, by the second terminal, a determining response of supporting the bit rate and the resolution of the media stream, the frame rate of the media stream, and/or the encoding and decoding information of the media stream to the first terminal, where the determining response includes a bit rate, resolution, a frame rate of the media stream, and/or encoding and decoding information of the media stream that are supported by the second terminal.

In a third aspect, an embodiment of the present invention further provides a terminal, including a receiving unit configured to receive a start instruction triggered by a user to start a service of sharing audio and video; a searching unit configured to, after the receiving unit receives the start instruction, search for, according to the start instruction, a terminal capable of implementing sharing of a media stream with the terminal, and display the found terminal or terminal list; a determining unit configured to determine, in the terminals or terminal list found by the searching unit, a terminal selected by a user; an obtaining unit configured to obtain a playing attribute of a second terminal when the determining unit determines that the terminal selected by a user is the second terminal; and a media stream synchronization unit configured to, after the obtaining unit obtains the playing attribute of the second terminal, synchronize a media stream to the second terminal according to the playing attribute, where the media stream is sent by a third terminal, causing the second terminal to decode and play the media stream.

With reference to the third aspect, in a first possible implementation manner, the receiving unit is configured to receive, in a process of receiving the media stream sent by the third terminal, the start instruction triggered by a user to start the service of sharing audio and video.

With reference to the third aspect, in a second possible implementation manner, the obtaining unit is configured to send an attribute obtaining request to the second terminal, where the attribute obtaining request includes a bit rate, resolution, a frame rate, and/or encoding and decoding information of a media stream currently played; and after the second terminal determines that the bit rate and the resolution of the media stream, the frame rate of the media stream, and/or the encoding and decoding information of the media stream are supported, receive the playing attribute sent by the second terminal, where the playing attribute includes a listening address and port of the second terminal.

With reference to the third aspect and the foregoing possible implementation manners, in a third possible implementation manner, the media stream synchronization unit is configured to, after the obtaining unit obtains the playing attribute of the second terminal, copy the media stream sent by the third terminal, and send the copied media stream to the listening address and port of the second terminal.

With reference to the third aspect and the foregoing first possible implementation manner, in a fourth possible implementation manner, the terminal further includes a sending unit configured to send an ending notification to the second terminal after the media stream of the third terminal received by the receiving unit stops, causing the second terminal to disable the listening address and port of the second terminal according to the ending notification.

In a fourth aspect, an embodiment of the present invention further provides a terminal, including a receiving unit configured to receive an attribute obtaining request sent by another terminal, where the attribute obtaining request comprises a bit rate, resolution, a frame rate, and/or encoding and decoding information of a media stream currently played on the other terminal, and the attribute obtaining request is sent when a terminal that is capable of implementing sharing of a media stream with the other terminal and is found by the other terminal according to a start instruction triggered by a user to start a service of sharing audio and video, in a process of receiving the media stream by the other terminal, is the terminal; a determining unit configured to, after the receiving unit receives the attribute obtaining request, determine, according to the attribute obtaining request, whether the bit rate and the resolution of the media stream, the frame rate of the media stream, and/or the encoding and decoding information of the media stream can be supported; and a sending unit configured to, after the determining unit determines that the terminal is capable of supporting the bit rate and the resolution of the media stream, the frame rate of the media stream, and/or the encoding and decoding information of the media stream, send a playing attribute of the terminal to the other terminal, where the playing attribute includes a listening address and port of the terminal; where the receiving unit is further configured to, after the sending unit sends the playing attribute, receive a media stream of a third terminal that is received by the other terminal and is sent by the other terminal according to the playing attribute.

With reference to the fourth aspect, in a first possible implementation manner, the sending unit is further configured to, after the determining unit determines that the terminal fails to support the bit rate and the resolution of the media stream, the frame rate of the media stream, and/or the encoding and decoding information of the media stream, send a response of a support failure to the other terminal, causing the other terminal to end the service of sharing audio and video with the terminal.

In a fifth aspect, an embodiment of the present invention further provides a terminal, including a receiver configured to receive a start instruction triggered by a user to start a service of sharing audio and video; and a processor configured to, after the receiver receives the start instruction, search for, according to the start instruction, a terminal capable of implementing sharing of a media stream with the terminal, display the found terminal or terminal list, and when it is determined, in the found terminal or terminal list, that a terminal selected by a user is a second terminal, obtain a playing attribute of the second terminal; and synchronize a media stream to the second terminal according to the playing attribute, where the media stream is sent by a third terminal, causing the second terminal to decode and play the media stream.

With reference to the fifth aspect, in a first possible implementation manner, the receiver is configured to receive, in a process of receiving the media stream sent by the third terminal, the start instruction triggered by a user to start the service of sharing audio and video.

With reference to the fifth aspect, in a second possible implementation manner, the processor is configured to send an attribute obtaining request to the second terminal, where the attribute obtaining request includes a bit rate, resolution, a frame rate, and/or encoding and decoding information of a media stream currently played; after the second terminal determines that the bit rate and the resolution of the media stream, the frame rate of the media stream, and/or the encoding and decoding information of the media stream are supported, receive the playing attribute sent by the second terminal, where the playing attribute includes a listening address and port of the second terminal; and copy the media stream sent by the third terminal, and send the copied media stream to the listening address and port of the second terminal.

With reference to the fifth aspect and the foregoing first possible implementation manner, in a third possible implementation manner, the terminal further includes a transmitter configured to send an ending notification to the second terminal after the media stream of the third terminal received by the receiver stops, causing the second terminal to disable the listening address and port of the second terminal according to the ending notification.

In a sixth aspect, an embodiment of the present invention further provides a terminal, including a receiver configured to receive an attribute obtaining request sent by another terminal, where the attribute obtaining request comprises a bit rate, resolution, a frame rate, and/or encoding and decoding information of a media stream currently played on the other terminal, and the attribute obtaining request is sent when a terminal that is capable of implementing sharing of a media stream with the other terminal and is found by the other terminal according to a start instruction triggered by a user to start a service of sharing audio and video, in a process of receiving the media stream by the other terminal, is the terminal; a processor configured to, after the receiver receives the attribute obtaining request, determine, according to the attribute obtaining request, whether the bit rate and the resolution of the media stream, the frame rate of the media stream, and/or the encoding and decoding information of the media stream can be supported; and a transmitter configured to, after the processor determines that the terminal is capable of supporting the bit rate and the resolution of the media stream, the frame rate of the media stream, and/or the encoding and decoding information of the media stream, send a playing attribute of the terminal to the other terminal, where the playing attribute includes a listening address and port of the terminal; where the receiver is further configured to, after the transmitter sends the playing attribute, receive a media stream of a third terminal that is received by the other terminal and is sent by the other terminal according to the playing attribute.

With reference to the sixth aspect, in a first possible implementation manner, the transmitter is further configured to, after the processor determines that the terminal fails to support the bit rate and the resolution of the media stream, the frame rate of the media stream, and/or the encoding and decoding information of the media stream, send a response of a support failure to the other terminal, causing the other terminal to end the service of sharing audio and video with the terminal.

As can be known from the foregoing technical solutions, according to the media stream sharing method and terminal in the embodiments of the present invention, after a user determines a second terminal for media stream sharing, a first terminal obtains a playing attribute of the second terminal and synchronizes, according to the playing attribute, a media stream currently played to the second terminal, causing the second terminal to decode and play the media stream, thereby solving problems of audio and video asynchronization and high costs during media stream sharing in the prior art.

BRIEF DESCRIPTION OF DRAWINGS

To illustrate the technical solutions of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

FIG. 3 is a schematic flowchart of a media stream sharing method according to another embodiment of the present invention;

FIG. 4 is a schematic structural diagram of a terminal according to an embodiment of the present invention;

DESCRIPTION OF EMBODIMENTS

To make the objectives, technical solutions, and advantages of the present invention more comprehensible, the following clearly describes the technical solutions in the embodiments of the present invention with reference to the accompanying drawings in the embodiments of the present invention. The described embodiments are merely a part of the embodiments of the present invention. Based on the following embodiments of the present invention, persons of ordinary skill in the art may obtain other embodiments used to solve the technical issue of the present invention and achieve the technical effect of the present invention by making equivalent changes to some or all technical features, without any creative effort, where the equivalent changes evidently fall within the scope of the present invention.

A media stream sharing method in the embodiments may be applied in a video call service scenario where a user may share a screen on a first terminal (for example, a pad) to a second terminal (for example, a set top box (STB) or an intelligent TV), thereby implementing playing on a large screen and displaying a status of another user through a voice and video on the large screen. In the foregoing method, the second terminal can decode a media stream received in real time and play the received media stream on the large screen, which reduces the number of processes, reduces delay and bandwidth occupation, and synchronizes the audio and video, thereby providing good user experience.

Figure 1:
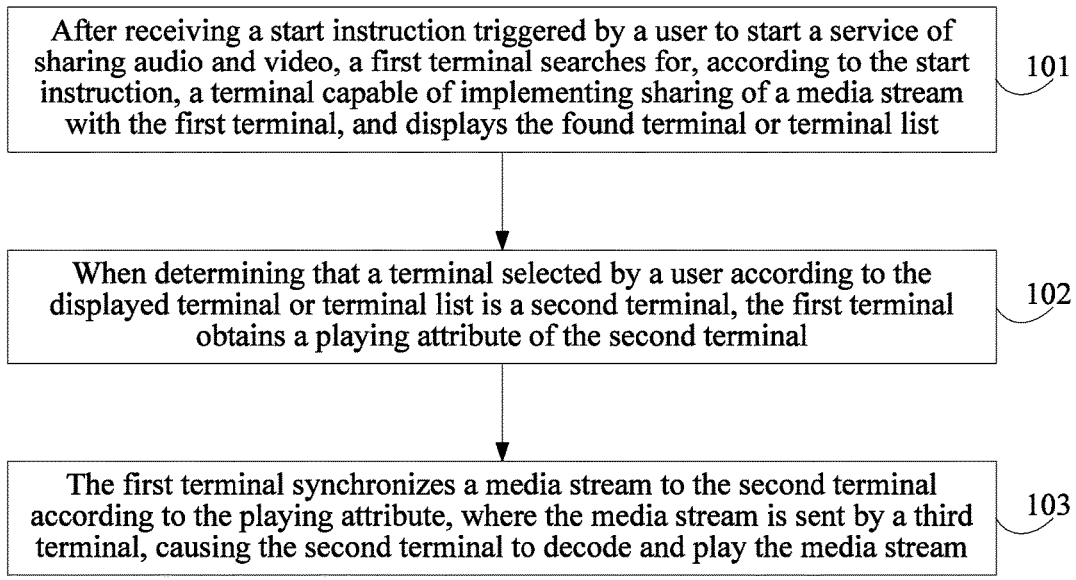
FIG. 1 is a schematic flowchart of a media stream sharing method according to an embodiment of the present invention.

FIG. 1 is a schematic flowchart of a media stream sharing method according to an embodiment of the present invention. As shown in FIG. 1, the media stream sharing method in this embodiment includes the following steps:

101. After receiving a start instruction triggered by a user to start a service of sharing audio and video, a first terminal searches for, according to the start instruction, a terminal capable of implementing sharing of a media stream with the first terminal, and displays the found terminal or terminal list.

For example, the terminal list is a list where the found terminal is located.

102. When determining that a terminal selected by a user according to the displayed terminal or terminal list is a second terminal, the first terminal obtains a playing attribute of the second terminal.

For example, the playing attribute here may be a listening address and port of the second terminal, that is, the listening address and port enabled by the second terminal for the media stream sharing.

103. The first terminal synchronizes a media stream to the second terminal according to the playing attribute, where the media stream is sent by a third terminal, causing the second terminal to decode and play the media stream.

Certainly, in a practical application, before "the first terminal receives the start instruction triggered by a user to start the service of sharing audio and video" in step 101, the foregoing method may further include the following step 100 that is not shown in the figure.

100. The first terminal has received the media stream sent by the third terminal.

That is, the first terminal has implemented a video call to the third terminal through a video call service.

In particular, all terminals to which the media stream sharing method is practically applied can support a digital living network alliance (DLNA) technology. That is, one or more terminals in the terminals or terminal list found by the first terminal within a home area network according to the service of sharing audio and video support a DLNA technology.

The media stream sharing method in this embodiment is applicable to a home area network or a small office.

In the foregoing embodiment, the first terminal may be a mobile phone or a pad, the second terminal may be a set top box or an intelligent TV, and the third terminal may be a mobile phone, a pad, a set top box, or the like.

As can be known from the foregoing embodiment, according to the media stream sharing method in this embodiment, after a user determines a second terminal for media stream sharing, a first terminal obtains a playing attribute of the second terminal and synchronizes, according to the playing attribute, a media stream currently played to the second terminal, causing the second terminal to decode and play the media stream, thereby solving problems of audio and video asynchronization, operational complexity, and high costs during media stream sharing in the prior art.

Figure 2:
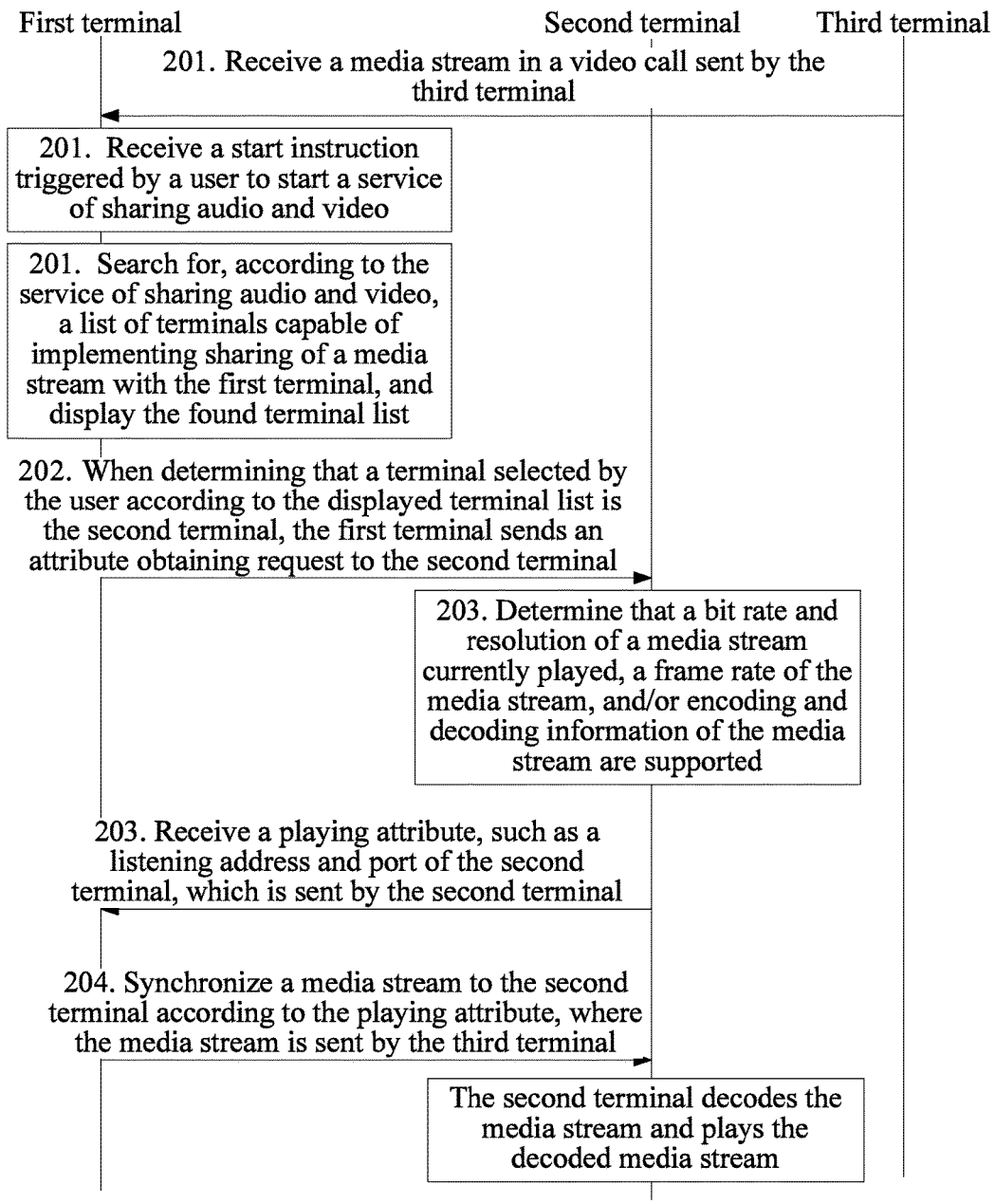
FIG. 2 is a schematic flowchart of a media stream sharing method according to another embodiment of the present invention.

FIG. 2 is a schematic flowchart of a media stream sharing method according to another embodiment of the present invention. As shown in FIG. 2, the media stream sharing method in this embodiment includes the following steps:

A user starts a service of sharing audio and video during a video call of a first terminal and prepares to forward an STB or an intelligent TV a media stream received during the video call for playing.

201. The first terminal receives a media stream in the video call, where the media stream is sent by a third terminal, and after receiving a start instruction triggered by a user to start the service of sharing audio and video, the first terminal searches for, according to the start instruction, a list of terminals capable of implementing sharing of a service of sharing audio and video with the first terminal, and displays the found terminal list.

For example, the first terminal may query, through a DLNA technology, other terminal within a local home area network and a list of a service entry corresponding to the terminal.

That is to say, the terminals with which the media stream can be shared can be found through the current DLNA technology, and the list of service entries corresponding to these terminals can also be obtained.

The above-mentioned other terminals within the local home area network may be an STB, an intelligent TV, a computer, and the like.

202. When the first terminal determines that a terminal selected by a user according to the displayed terminal list is a second terminal, the first terminal sends an attribute obtaining request to the second terminal, where the attribute obtaining request includes a bit rate, resolution, a frame rate, and/or encoding and decoding information of a media stream currently played.

The second terminal may be an STB. For example, the attribute obtaining request may further include information such as the maximum bit rate and the maximum frame rate of the media stream. This embodiment merely uses the attribute obtaining request as an example for description, but does not limit information content included in the attribute obtaining request.

203. After the second terminal determines that the bit rate, the resolution, the frame rate, and/or the encoding and decoding information of a media stream currently played are supported, the first terminal receives a playing attribute sent by the second terminal, where the playing attribute includes a listening address and port of the second terminal.

For example, in the foregoing step 203, the listening address and port of the second terminal may be a listening address and port enabled by the second terminal for the service of sharing audio and video. Optionally, before a step of receiving, by the first terminal, a playing attribute sent by the second terminal, the method may further include receiving, by the first terminal, a determining response of supporting the bit rate and the resolution of the media stream currently played, the frame rate of the media stream, and/or the encoding and decoding information of the media stream, where the determining response is sent by the second terminal and includes content such as the bit rate, the resolution, the frame rate of the media stream, and/or the encoding and decoding information of the media stream that are supported by the second terminal.

204. The first terminal synchronizes a media stream to the second terminal according to the playing attribute, where the media stream is sent by a third terminal, causing the second terminal to decode and play the media stream.

For example, the first terminal copies the media stream sent by the third terminal and sends the copied media stream to the listening address and port of the second terminal.

In a practical application, the first terminal firstly registers a transmission hook function, and after the registration, the first terminal may copy a media stream that is sent by the third terminal and is continuously received and send the media stream to the listening address and port of the second terminal.

Optionally, in a practical application, the foregoing media stream sharing method may further include the following step 205 that is not shown in the figure.

205. The first terminal sends an ending notification to the second terminal after transmission of the media stream of the third terminal stops, so that the second terminal disables the listening address and port of the second terminal according to the ending notification.

The media stream sharing method in this embodiment is applied in a home area network environment, and a video call originally made on a first terminal such as a mobile phone or a pad is transferred through a WiFi network to a second terminal such as an intelligent TV or a set top box for playing. That is to say, according to the foregoing method, the second terminal provides a listening address and port for receiving a media stream forwarded from the first terminal side, and the first terminal forwards in real time the media stream to the second terminal such as an STB or an intelligent TV for playing, where the media stream is sent by a third terminal, thereby ensuring that the first terminal delivers good user experience.

FIG. 3 is a schematic flowchart of a media stream sharing method according to another embodiment of the present invention. As shown in FIG. 3, the media stream sharing method in this embodiment includes the following steps:

301. In a process of receiving the media stream by a first terminal, when a terminal that is capable of implementing sharing of a media stream with the first terminal and is found by the first terminal according to a start instruction of a service of sharing audio and video is a second terminal, the second terminal receives an attribute obtaining request sent by the first terminal, where the attribute obtaining request includes a bit rate, resolution, a frame rate, and/or encoding and decoding information of a media stream currently played.

302. If the second terminal determines, according to the attribute obtaining request, that the bit rate and the resolution of the media stream, the frame rate of the media stream, and/or the encoding and decoding information of the media stream can be supported, the second terminal sends a playing attribute of the second terminal to the first terminal, where the playing attribute includes a listening address and port of the second terminal.

For example, in the foregoing step, the listening address and port of the second terminal may be a listening address and port enabled by the second terminal for the service of sharing audio and video.

303. The second terminal receives a media stream of a third terminal that is received by the first terminal and is sent by the first terminal according to the playing attribute.

Certainly, in a practical application, if the second terminal determines, according to the attribute obtaining request, that the bit rate, the resolution, the frame rate, and/or the encoding and decoding information of the media stream currently played fail to be supported, a response of a support failure is sent to the first terminal, so that the first terminal ends the service of sharing audio and video with the second terminal.

Optionally, before the step of "sending a playing attribute of the second terminal to the first terminal" in step 302, the media stream sharing method in this embodiment may further include the following step S01 that is not shown in the figure.

S01. The second terminal may further send a determining response of supporting the bit rate, the resolution, the frame rate, and/or the encoding and decoding information of a media stream currently played to the first terminal, where the determining response includes content such as the bit rate, the resolution, the frame rate of the media stream, and/or the encoding and decoding information of the media stream that are supported by the second terminal.

Optionally, in a practical application, the foregoing media stream sharing method may further include the following step 304 that is not shown in the figure.

304. The second terminal receives an ending notification that is sent by the first terminal after transmission of the media stream of the third terminal stops, and disables the listening address and port of the second terminal according to the ending notification.

According to the media stream sharing method in this embodiment, in a video call scenario, an audio and video of a friend can be shared seamlessly onto a television screen for playing, thereby improving user experience and solving problems of long sharing delay, poor experience, and inconvenient voice and video input on a set top box.

According to another aspect of the present invention, an embodiment of the present invention further provides a terminal. As shown in FIG. 4, the terminal includes a receiving unit 41, a searching unit 42, a determining unit 43, an obtaining unit 44, and a media stream synchronization unit 45.

The receiving unit 41 is configured to receive a start instruction triggered by a user to start a service of sharing audio and video.

The searching unit 42 is configured to, after the receiving unit 41 receives the start instruction triggered by a user to start the service of sharing audio and video, search for, according to the start instruction, a terminal capable of implementing sharing of a media stream with the terminal, and display the found terminal or terminal list.

The determining unit 43 is configured to determine, in the terminals or terminal list found by the searching unit 42, a terminal selected by a user.

The obtaining unit 44 is configured to obtain a playing attribute of a second terminal when the determining unit 43 determines that the terminal selected by a user is the second terminal.

The media stream synchronization unit 45 is configured to, after the obtaining unit 44 obtains the playing attribute of the second terminal, synchronize a media stream to the second terminal according to the playing attribute, where the media stream is sent by a third terminal, causing the second terminal to decode and play the media stream.

For example, the foregoing receiving unit 41 is configured to receive, in a process of receiving the media stream sent by the third terminal, the start instruction triggered by a user to start the service of sharing audio and video.

The foregoing obtaining unit 44 is configured to send an attribute obtaining request to the second terminal, where the attribute obtaining request includes a bit rate, resolution, a frame rate, and/or encoding and decoding information of a media stream currently played; and after the second terminal determines that the bit rate and the resolution of the media stream, the frame rate of the media stream, and/or the encoding and decoding information of the media stream are supported, receive the playing attribute sent by the second terminal, where the playing attribute includes a listening address and port of the second terminal.

The foregoing media stream synchronization unit 45 is configured to, after the obtaining unit obtains the playing attribute of the second terminal, copy the media stream sent by the third terminal, and send the copied media stream to the listening address and port of the second terminal.

In an optional application scenario, the foregoing terminal may further include a sending unit 46 that is not shown in the figure, where the sending unit 46 is configured to send an ending notification to the second terminal after the media stream of the third terminal that is received by the receiving unit 41 stops, causing the second terminal to disable the listening address and port of the second terminal according to the ending notification.

The terminal in this embodiment is capable of implementing multi-screen sharing of a media stream on multiple terminals, thereby improving user experience on the terminals.

Figure 5:
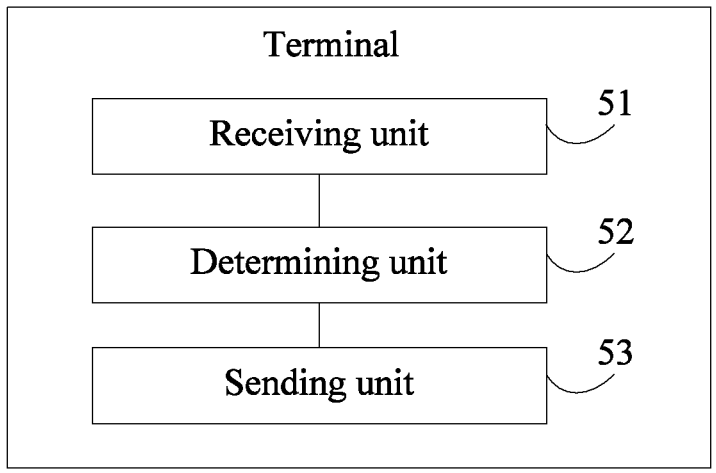
FIG. 5 is a schematic structural diagram of a terminal according to another embodiment of the present invention.

According to another aspect of the present invention, an embodiment of the present invention further provides a terminal. As shown in FIG. 5, the terminal includes a receiving unit 51, a determining unit 52, and a sending unit 53.

The receiving unit 51 is configured to receive an attribute obtaining request sent by another terminal, where the attribute obtaining request includes a bit rate, resolution, a frame rate, and/or encoding and decoding information of a media stream currently played, and the attribute obtaining request is sent when a terminal that is capable of implementing sharing of a media stream with the other terminal and is found by the other terminal according to a start instruction triggered by a user to start a service of sharing audio and video, in a process of receiving the media stream by the other terminal, is the terminal.

The determining unit 52 is configured to, after the receiving unit 51 receives the attribute obtaining request, determine, according to the attribute obtaining request, whether the bit rate and the resolution of the media stream, the frame rate of the media stream, and/or the encoding and decoding information of the media stream can be supported.

The sending unit 53 is configured to, after the determining unit 52 determines that the terminal is capable of supporting the bit rate and the resolution of the media stream, the frame rate of the media stream, and/or the encoding and decoding information of the media stream, send a playing attribute of the terminal to the other terminal, where the playing attribute includes a listening address and port of the terminal.

The receiving unit 51 is further configured to, after the sending unit 53 sends the playing attribute, receive a media stream of a third terminal that is received by the other terminal and is sent by the other terminal according to the playing attribute.

In an optional application scenario, the foregoing sending unit 53 is further configured to, after the determining unit 52 determines that the terminal fails to support the bit rate and the resolution of the media stream, the frame rate of the media stream, and/or the encoding and decoding information of the media stream, send a response of a support failure to the other terminal, so that the other terminal ends the service of sharing audio and video with the terminal.

The terminal in this embodiment is capable of implementing multi-screen sharing of a media stream on multiple terminals, thereby improving user experience on the terminals.

Figure 6:
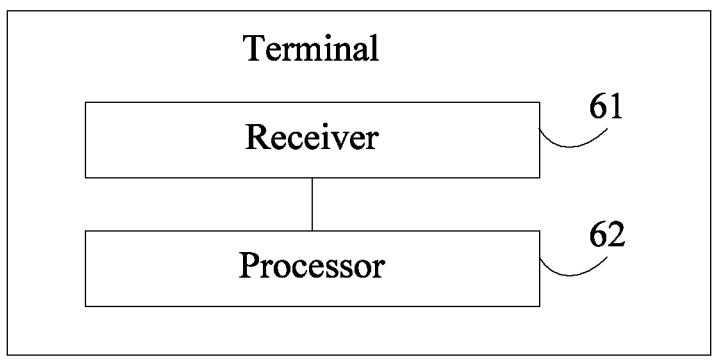
FIG. 6 is a schematic structural diagram of a terminal according to another embodiment of the present invention.

According to another aspect of the present invention, an embodiment of the present invention further provides a terminal. As shown in FIG. 6, the terminal includes a receiver 61 and a processor 62.

The receiver 61 is configured to receive a start instruction triggered by a user to start a service of sharing audio and video.

The processor 62 is configured to after the receiver 61 receives the start instruction, search for, according to the start instruction, a terminal capable of implementing sharing of a media stream with the terminal, display the found terminal or terminal list, and when it is determined, in the found terminal or terminal list, that a terminal selected by a user is a second terminal, obtain a playing attribute of the second terminal; and synchronize a media stream to the second terminal according to the playing attribute, where the media stream is sent by a third terminal, so that the second terminal decodes and plays the media stream.

Optionally, the foregoing receiver 61 may be configured to receive, in a process of receiving the media stream sent by the third terminal, the start instruction triggered by a user to start the service of sharing audio and video.

The foregoing processor 62 may be configured to send an attribute obtaining request to the second terminal, where the attribute obtaining request includes a bit rate, resolution, a frame rate, and/or encoding and decoding information of a media stream currently played; after the second terminal determines that the bit rate and the resolution of the media stream, the frame rate of the media stream, and/or the encoding and decoding information of the media stream are supported, receive the playing attribute sent by the second terminal, where the playing attribute includes a listening address and port of the second terminal; and copy the media stream sent by the third terminal, and send the copied media stream to the listening address and port of the second terminal.

In an optional application scenario, the foregoing terminal may further include a transmitter 63 that is not shown in the figure, where the transmitter 63 is configured to send an ending notification to the second terminal after the media stream of the third terminal received by the receiver 61 stops, causing the second terminal to disable the listening address and port of the second terminal according to the ending notification.

The terminal in this embodiment is capable of implementing multi-screen sharing of a media stream on multiple terminals, thereby improving user experience on the terminals.

Figure 7:
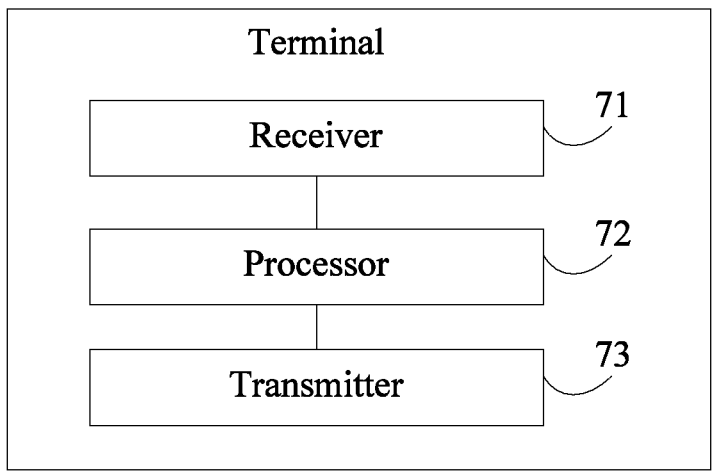
FIG. 7 is a schematic structural diagram of a terminal according to another embodiment of the present invention.

According to another aspect of the present invention, an embodiment of the present invention further provides a terminal. As shown in FIG. 7, the terminal includes a receiver 71, a processor 72, and a transmitter 73.

The receiver 71 is configured to receive an attribute obtaining request sent by another terminal, where the attribute obtaining request includes a bit rate, resolution, a frame rate, and/or encoding and decoding information of a media stream currently played, and the attribute obtaining request is sent when a terminal that is capable of implementing sharing of a media stream with the other terminal and is found by the other terminal according to a start instruction triggered by a user to start a service of sharing audio and video, in a process of receiving the media stream by the other terminal, is the terminal.

The processor 72 is configured to, after the receiver 71 receives the attribute obtaining request, determine, according to the attribute obtaining request, whether the bit rate and the resolution of the media stream, the frame rate of the media stream, and/or the encoding and decoding information of the media stream can be supported.

The transmitter 73 is configured to, after the processor 72 determines that the terminal is capable of supporting the bit rate and the resolution of the media stream, the frame rate of the media stream, and/or the encoding and decoding information of the media stream, send a playing attribute of the terminal to the other terminal, where the playing attribute includes a listening address and port of the terminal.

The receiver 71 is further configured to, after the transmitter 73 sends the playing attribute, receive a media stream of a third terminal that is received by the other terminal and is sent by the other terminal according to the playing attribute.

In an optional application scenario, the transmitter 73 is further configured to, after the processor 72 determines that the terminal fails to support the bit rate and the resolution of the media stream, the frame rate of the media stream, and/or the encoding and decoding information of the media stream, send a response of a support failure to the other terminal, so that the other terminal ends the service of sharing audio and video with the terminal.

The terminal in this embodiment is capable of implementing multi-screen sharing of a media stream on multiple terminals, thereby improving user experience on the terminals.

Figure 8:
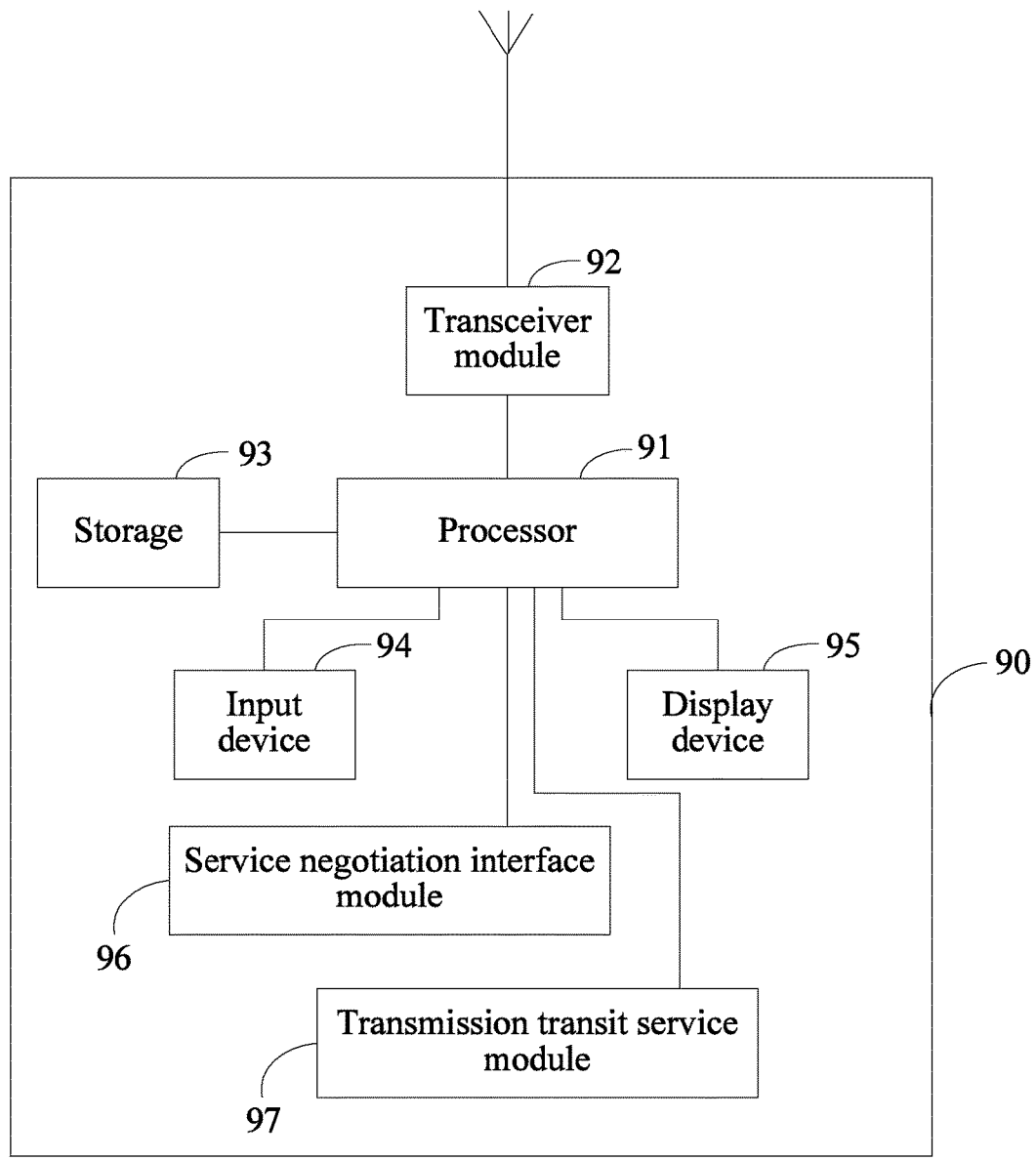
FIG. 8 is a schematic structural diagram of a terminal according to another embodiment of the present invention.

In addition, FIG. 8 is a schematic structural diagram of a terminal according to another embodiment of the present invention. As shown in FIG. 8, the terminal may be a mobile phone, a tablet computer, a personal digital assistant (PDA), a set top box, an intelligent TV, or the like, and this embodiment takes a mobile phone terminal as an example for description.

As shown in FIG. 8, the mobile phone terminal 90 includes a processor 91, a transceiver module 92, a storage 93, an input device 94, a display device 95, a service negotiation interface module 96, and a transmission transit service module 97.

The processor 91 of the mobile phone terminal 90 is a control center of the mobile phone terminal 90. It connects each part of the entire mobile phone using various interfaces and lines, and performs various functions of the mobile phone terminal 90 and processes data by running or executing a software program and/or a module stored in the storage 93 and invoking the data stored in the storage 93, thereby performing overall monitoring on the mobile phone terminal 90. Optionally, the processor 91 may integrate an application processor and a modulation and demodulation processor, where the application processor mainly processes an operating system, a user interface, an application program, and the like, and the modulation and demodulation processor mainly processes radio communication. It can be understood that the foregoing modulation and demodulation processor may also not be integrated into the processor 91.

The transceiver module 92 may be configured to receive and send a signal in a process of receiving and sending information or a call; in particular, for the mobile phone terminal 90, receive downlink information of a base station and then send the downlink information to the processor 91 for processing; in addition, send uplink data to the base station. In addition, the transceiver module 92 may further communicate with another device through radio communication and a network. In the radio communication, any communication standard or protocol may be used.

The storage 93 may be configured to store the software program (for example, a service program of sharing audio and video) and the module, and the processor 91 performs various function applications of the mobile phone terminal 90 and processes data by running the software program and the module that are stored in the storage 93. The storage 93 may mainly include a program storage area and a data storage area, where the program storage area may store the operating system, an application program required by at least one function (for example, a sound playing function and an image playing function), and the data storage area may store data (for example, audio data and a telephone directory) that is created according to usage of the mobile phone terminal 90, and so on. In addition, the storage 93 may include a high speed random access memory and may further include a non-volatile memory, for example, at least one disk storage device, at least one Flash storage device, or another volatile solid-state storage device.

The input device 94 may be configured to receive input digit or character information and produce key signal input related to user configuration and function control of the mobile phone terminal 90. The input device 94 may include a touch panel and another input device. The touch panel, also called a touchscreen, may collect a touch operation by a user on or nearby it (for example, an operation of a user on the touch panel or near the touch panel using any suitable object or accessory, such as a finger and a stylus), and drive a corresponding connected apparatus according to a preset program. Optionally, the touch panel may include two parts, that is, a touch detection apparatus and a touch controller. The touch detection apparatus detects a touch direction of a user, detects a signal brought by a touch operation, and transmits the signal to the touch controller. The touch controller receives touch information from the touch detection apparatus, converts it into touch coordinates, and sends them to the processor 91, and the touch controller is capable of receiving and executing a command sent by the processor 91. In addition, the touch panel may be implemented using multiple types of waves, such as resistive, capacitive, infrared, and surface acoustic waves. In addition to the touch panel, the input device 94 may further include another input device. The other input device may include but is not limited to one or more of the following: a physical keyboard, a function key (for example, a volume control key and a switch key), a trackball, a mouse, and a joystick.

The display device 95 may be configured to display information input by a user or information provided for a user and various menus of the mobile phone terminal 90. The display device 95 may include a display panel, and optionally the display panel may be configured in a form such as a liquid crystal display (LCD) and an organic light-emitting diode (OLED). Further, the touch panel may cover the display panel. After detecting a touch operation on or nearby the touch panel, the touch panel transmits the touch operation to the processor 91 to determine a type of a touch event, and then the processor 91 provides corresponding visual input on the display panel according to the type of the touch event.

In this embodiment, the service negotiation interface module 96 is configured to interact with a DLNA (or similar to a device service discovery module) of another terminal that needs to share a media stream so as to obtain a terminal capable of sharing the media stream within a home area network and a device service entry corresponding to the terminal, and negotiate an audio and video interface with a corresponding service on another device such as an STB according to selection of a user.

The transmission transit service module 97 is configured to, after negotiation of the service negotiation interface module, take charge of forwarding a Real-time Transport Protocol (RTP) stream and a Real-time Transport Control Protocol (RTCP) stream of voice and video of a third terminal received by a transport layer of the terminal to a corresponding stream media listening address and port on a second terminal such as an STB.

Persons of ordinary skill in the art may understand that all or a part of the steps of the foregoing method embodiments may be implemented by a program instructing relevant hardware. The foregoing program may be stored in a computer readable storage medium. When the program runs, the steps of the forgoing method embodiments are performed. The foregoing storage medium includes various mediums capable of storing program codes, such as a read-only memory (ROM), a random access memory (RAM), a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A media stream sharing method comprising:
    receiving, at a first terminal, a start instruction from a user to start a service of sharing audio and video;
    searching for a second terminal capable of implementing media stream sharing with the first terminal;
    displaying the second terminal;
    obtaining a playing attribute of the second terminal;
    receiving a media stream from a third terminal, wherein the first terminal receives the media stream from the third terminal before the first terminal receives the start instruction from the user; and
    synchronizing, by the first terminal, the media stream to the second terminal according to the playing attribute.

2. The method according to claim 1, wherein obtaining the playing attribute of the second terminal comprises:
    sending, by the first terminal, an attribute obtaining request to the second terminal, wherein the attribute obtaining request includes a bit rate of the media stream, a resolution of the media stream, and a frame rate of the media stream; and
    receiving, by the first terminal, the playing attribute from the second terminal,
    wherein the second terminal supports the bit rate of the media stream, the resolution of the media stream, and the frame rate of the media stream, and
    wherein the playing attribute comprises a listening address and port of the second terminal.

3. The method according to claim 2, wherein before receiving the playing attribute from the second terminal, the method further comprises receiving, by the first terminal, a determining response of supporting the bit rate, the resolution of the media stream, and the frame rate of the media stream, and wherein the determining response is received from the second terminal and comprises the bit rate, the resolution, and the frame rate of the media stream.

4. The method according to claim 1, wherein synchronizing, by the first terminal, the media stream to the second terminal according to the playing attribute comprises:
    copying, by the first terminal, the media stream; and
    sending the copied media stream to a listening address and a port of the second terminal.

5. The method according to claim 1 further comprising sending, by the first terminal, an ending notification to the second terminal after transmission of the media stream from the third terminal stops.

6. A media stream sharing method comprising:
    receiving, by a second terminal, an attribute obtaining request from a first terminal when the second terminal is capable of implementing sharing of the media stream with the first terminal, wherein the attribute obtaining request comprises a bit rate, resolution, at least one of a frame rate and encoding and decoding information of the media stream currently played on the first terminal;
    sending a playing attribute of the second terminal to the first terminal when the second terminal determines, according to the attribute obtaining request, that the bit rate and the resolution of the media stream, at least one of the frame rate of the media stream, and the encoding and decoding information of the media stream can be supported, wherein the playing attribute comprises a listening address and port of the second terminal; and
    receiving, by the second terminal, the media stream of a third terminal from the first terminal according to the playing attribute.

7. The method according to claim 6 further comprising sending a response of a support failure to the first terminal when it is determined, according to the attribute obtaining request, that the bit rate, the resolution, at least one of the frame rate and the encoding and decoding information of the media stream currently played fail to be supported.

8. The method according to claim 6, wherein before sending the playing attribute of the second terminal to the first terminal, the method further comprises sending, by the second terminal, a determining response of supporting the bit rate and the resolution of the media stream, at least one of the frame rate of the media stream and the encoding and decoding information of the media stream to the first terminal, and wherein the determining response comprises the bit rate, the resolution, at least one of the frame rate of the media stream and the encoding and decoding information of the media stream that are supported by the second terminal.

9. A first terminal comprising:
    a receiver configured to:
        receive a media stream;
        receive a start instruction to start a service of sharing audio and video,
    wherein the receiver is configured to receive the media stream before receiving the start instruction; and
    a processor coupled to the receiver and configured to:
        search for a second terminal capable of implementing media stream sharing with the first terminal;
        obtain a playing attribute of the second terminal; and
        synchronize the media stream to the second terminal according to the playing attribute.

10. The first terminal according to claim 9, wherein the processor is configured to:
    send an attribute obtaining request to the second terminal, wherein the attribute obtaining request includes a bit rate of the media stream, a resolution of the media stream, and a frame rate of the media stream;
    receive the playing attribute from the second terminal, wherein the second terminal supports the bit rate of the media stream, the resolution of the media stream, and the frame rate of the media stream, and wherein the playing attribute comprises a listening address and a port of the second terminal; and send the media stream to the listening address and the port of the second terminal.

11. The first terminal according to claim 9, further comprising a transmitter coupled to the processor and configured to send an ending notification to the second terminal after the media stream stops being received by the receiver.

12. An apparatus comprising:
a receiver configured to receive an attribute obtaining request from a terminal, wherein the attribute obtaining request comprises a bit rate of a media stream, a resolution of a media stream, and at least one of a frame rate of the media stream or encoding and decoding information of the media stream;
a processor coupled to the receiver and configured to determine whether the bit rate of the media stream, the resolution of the media stream, and at least one of the frame rate of the media stream and the encoding and decoding information of the media stream are supported by the apparatus; and
a transmitter coupled to the processor and configured to send a playing attribute of the apparatus to the terminal, wherein the playing attribute comprises a listening address and a port of the apparatus, and
wherein the receiver is further configured to receive the media stream from the terminal.

13. The method according to claim 1, wherein obtaining the playing attribute of the second terminal comprises:
sending, by the first terminal, an attribute obtaining request to the second terminal, wherein the attribute obtaining request includes a bit rate of the media stream, a resolution of the media stream, and encoding and decoding information of the media stream; and
receiving, by the first terminal, the playing attribute from the second terminal, and
wherein the playing attribute comprises a listening address and port of the second terminal.

14. The method according to claim 13, wherein before receiving the playing attribute from the second terminal, the method further comprises receiving, by the first terminal, a determining response of supporting the bit rate of the media stream, the resolution of the media stream, and the encoding and decoding information of the media stream, and wherein the determining response is received from the second terminal and comprises the bit rate of the media stream, the resolution of the media stream, and encoding and decoding information of the media stream that are supported by the second terminal.

15. The method according to claim 1, wherein obtaining the playing attribute of the second terminal comprises:
sending, by the first terminal, an attribute obtaining request to the second terminal, wherein the attribute obtaining request includes a bit rate of the media stream, a resolution of the media stream, a frame rate of the media stream, and encoding and decoding information of the media stream; and
receiving, by the first terminal, the playing attribute from the second terminal, and
wherein the playing attribute comprises a listening address and port of the second terminal.

16. The method according to claim 15, wherein before receiving the playing attribute from the second terminal, the method further comprises receiving, by the first terminal, a determining response of supporting the bit rate of the media stream, the resolution of the media stream, a frame rate of the media stream, and the encoding and decoding information of the media stream.

17. The first terminal according to claim 9, wherein the processor is configured to:
send an attribute obtaining request to the second terminal, wherein the attribute obtaining request includes a bit rate of the media stream, a resolution of the media stream, and encoding and decoding information of the media stream;
receive the playing attribute from the second terminal, wherein the playing attribute comprises a listening address and a port of the second terminal; and
send the media stream to the listening address and the port of the second terminal.

18. The first terminal according to claim 9, wherein the processor is configured to:
send an attribute obtaining request to the second terminal, wherein the attribute obtaining request includes a bit rate of the media stream, a resolution of the media stream, a frame rate of the media stream, and encoding and decoding information of the media stream;
receive the playing attribute from the second terminal, wherein the playing attribute comprises a listening address and a port of the second terminal; and
send the media stream to the listening address and the port of the second terminal.

* * * * *